Dec. 1, 1942.  G. T. RONK  2,303,501
HIGHWAY OR TRANSPORT TRAILER
Filed May 20, 1940  5 Sheets-Sheet 1

INVENTOR.
GEORGE T. RONK
BY Flournoy Corey
ATTORNEY.

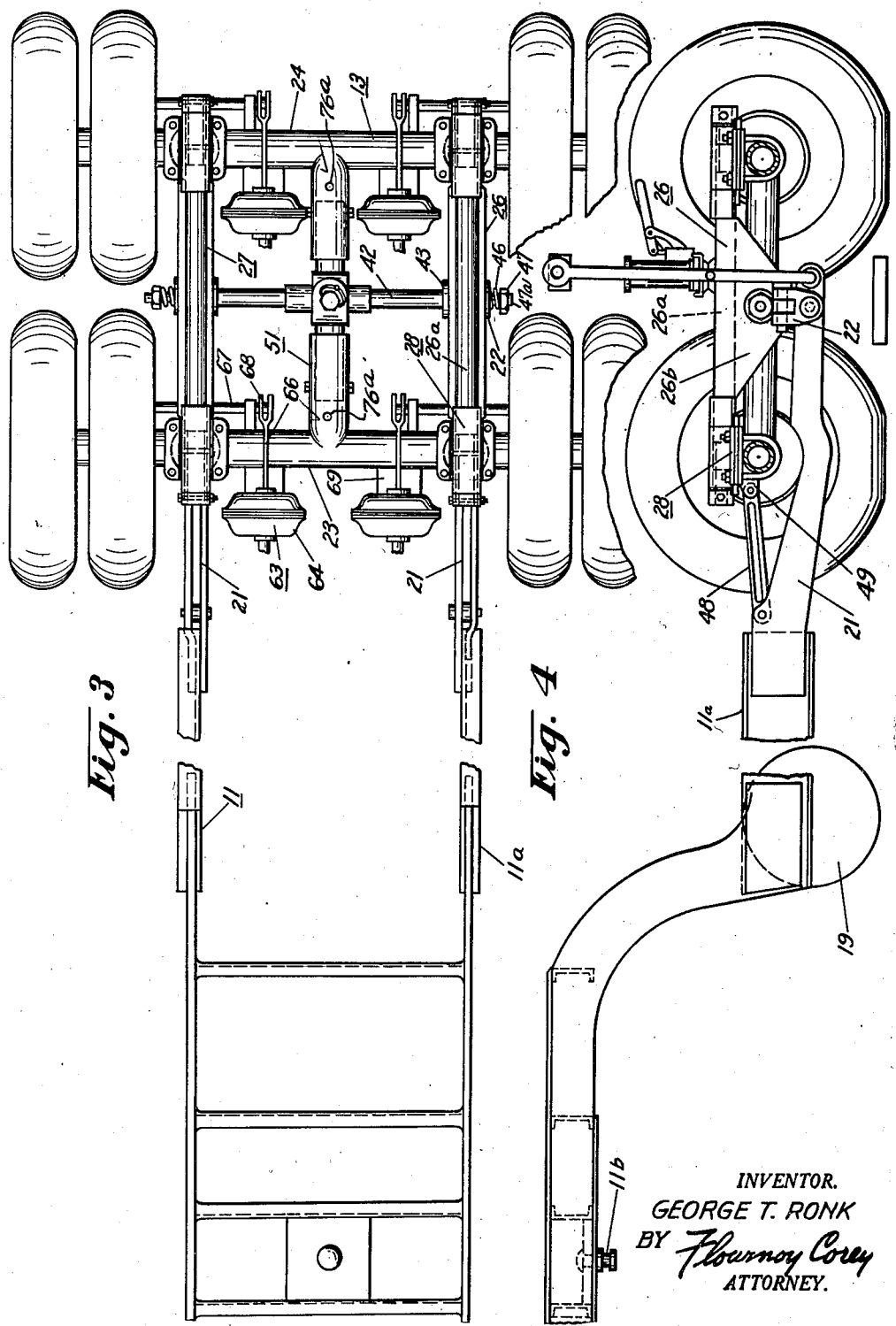

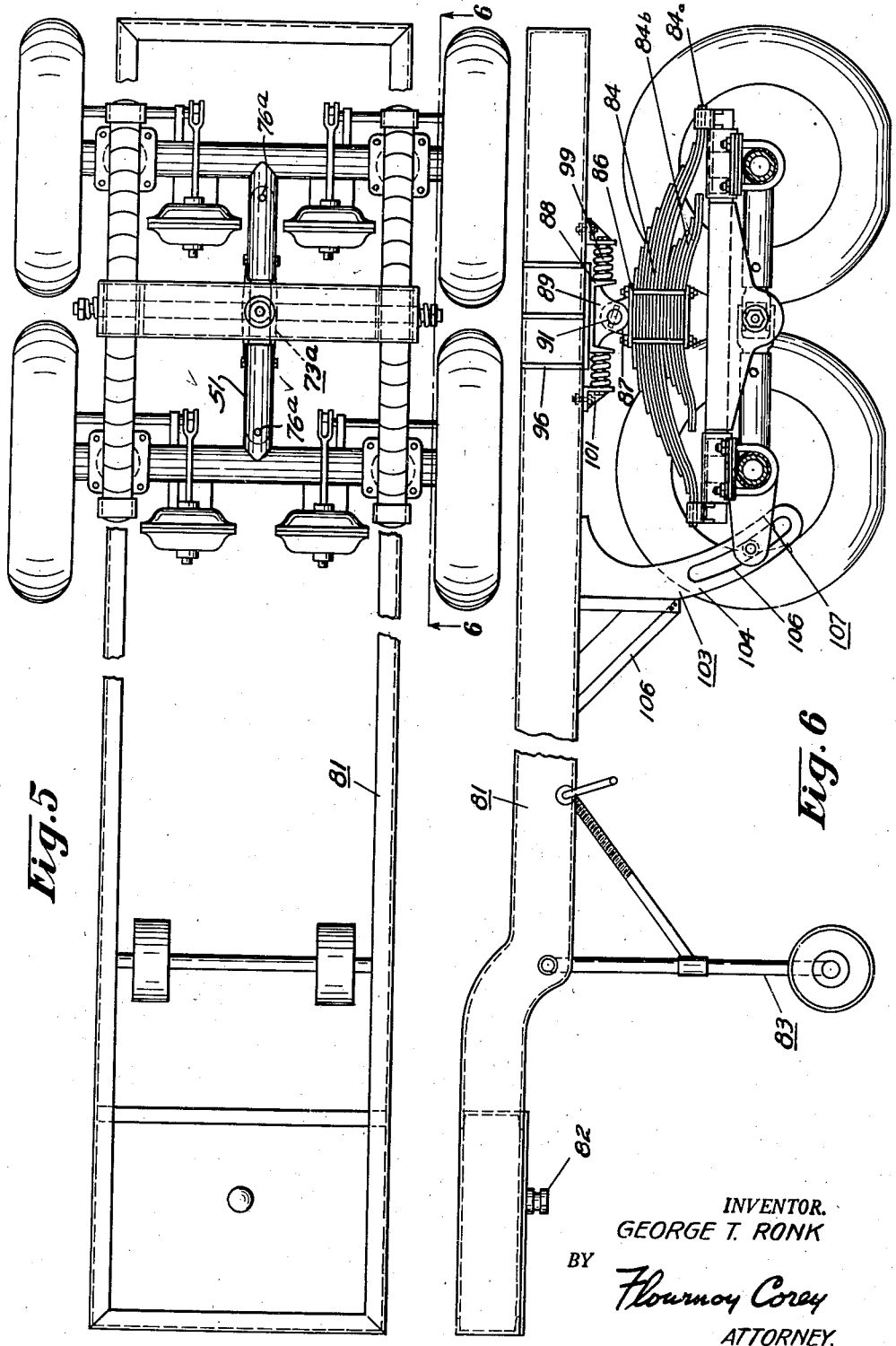

Dec. 1, 1942. G. T. RONK 2,303,501
HIGHWAY OR TRANSPORT TRAILER
Filed May 20, 1940 5 Sheets-Sheet 4
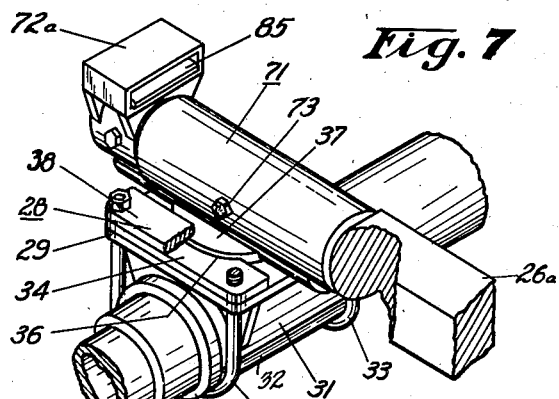
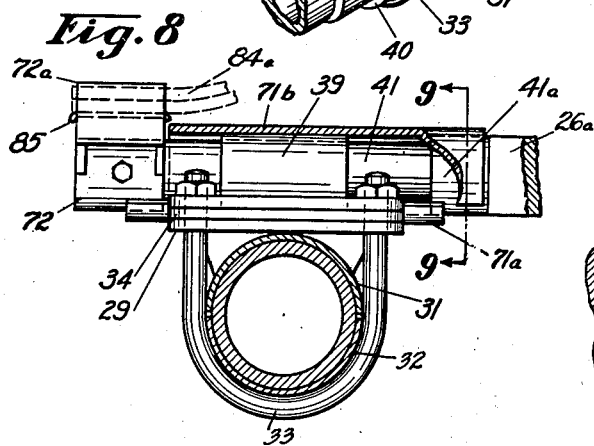
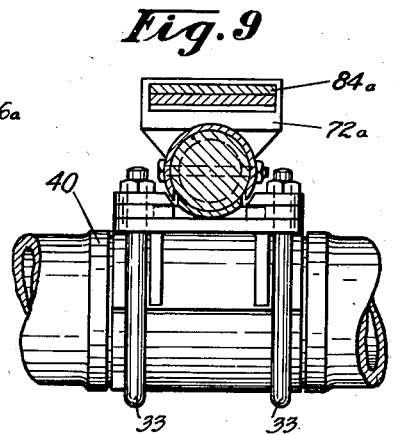
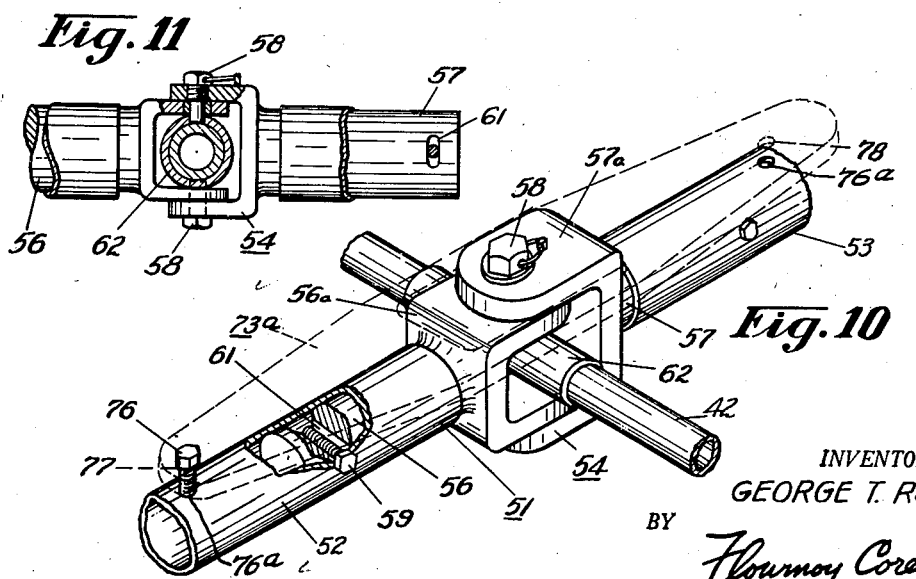
INVENTOR.
GEORGE T. RONK
BY
Flournoy Corey
ATTORNEY.

Dec. 1, 1942.                G. T. RONK                 2,303,501
                    HIGHWAY OR TRANSPORT TRAILER
                         Filed May 20, 1940              5 Sheets-Sheet 5
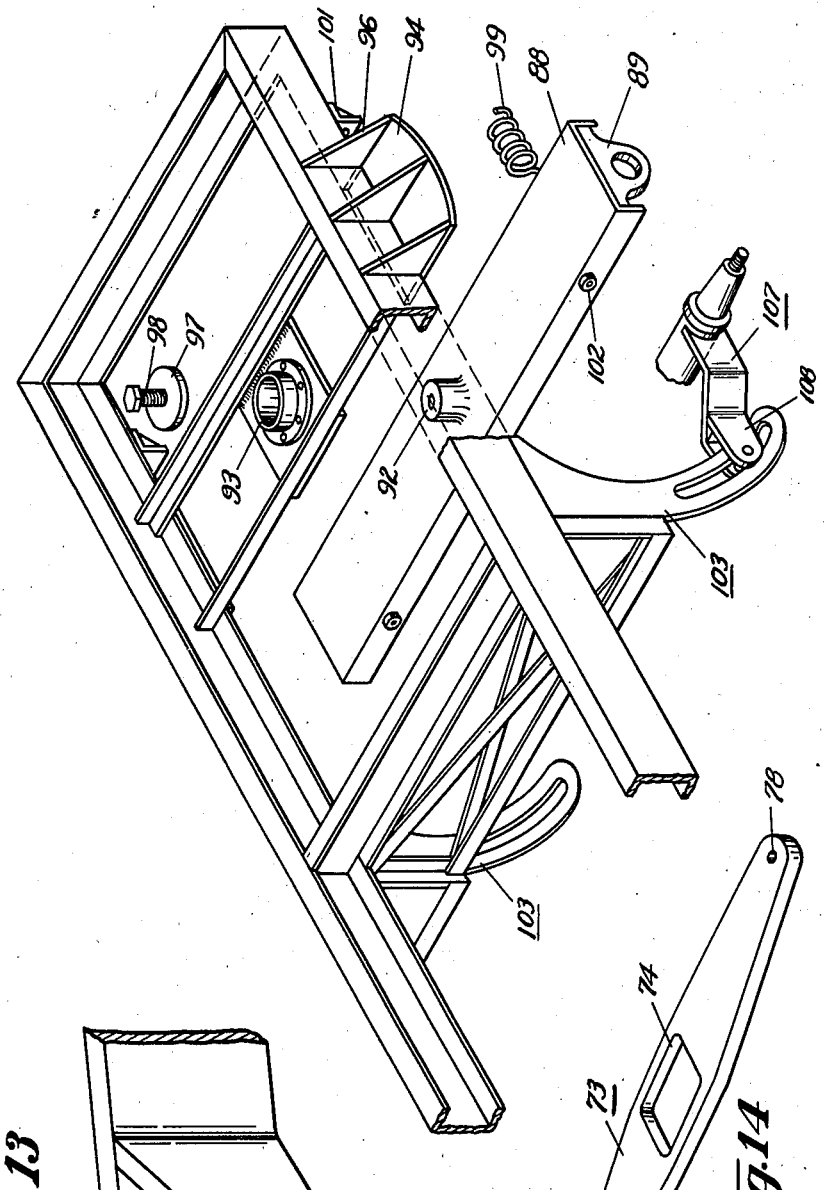
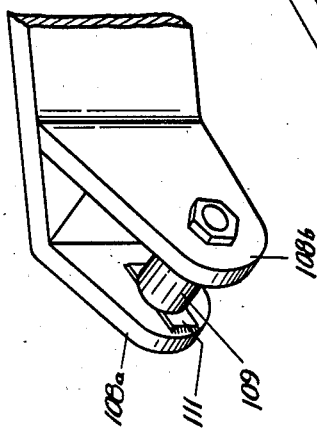
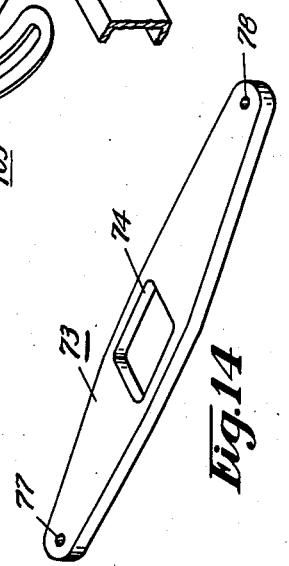
INVENTOR.
GEORGE T. RONK
BY
*Flournoy Corey*
ATTORNEY.

Patented Dec. 1, 1942

2,303,501

UNITED STATES PATENT OFFICE 2,303,501

HIGHWAY OR TRANSPORT TRAILER

George T. Ronk, Cedar Rapids, Iowa

Application May 20, 1940, Serial No. 336,166

16 Claims. (Cl. 280—124)

This invention relates to highway or transport trailers and has particular relation to supporting trucks for such devices.

In trucks and other highway vehicles, particularly those used in transporting heavy loads, it is the usual practice to mount the vehicle on a relatively large number of small tires, rather than a few large tires, in order to distribute the weight more widely over the road surface. Certain difficulties, however, are inherent in such practice. This invention concerns, in particular, the construction of a wheel truck on which a plurality of tires are mounted on tandem axles, but which overcomes the difficulties above mentioned.

In structures such as have been used heretofore, the wheels have been mounted in substantially fixed axle position, at least in such a manner as to prevent them from "tracking" properly, especially when rounding curves in the road.

Most of the supporting structures or trucks, as heretofore made, have lacked resilience and flexibility and I have noticed that, in passing over uneven road surfaces, the wheels are either not permitted to adapt themselves to the road surface so as to bear their share of the load, or do so only at the expense of a distorted frame.

The destructive forces there set up or generated result in skidding or "whetting" of tires, and in unequal loading and consequent heating and wear of tires, particularly when tandem axles are used, such that the useful life of the tires is shortened. These destructive forces may be so great that a new tire or even several new tires may not last for a single trip. The item of cost of replacement of tires due to these causes may and does become so great that trucking operations may not be profitably carried out, and it is a known fact that numerous trucking firms have had to go out of business because they could not control this destruction of tires.

A broad general object of my invention is to provide means to eliminate certain destructive forces acting on the tires of highway and transport vehicles to prolong the useful life of these tires and increase their efficiency as load carrying means.

It is one of the main objects of my invention to provide, in tandem wheel supporting means for trucking equipment, means for permitting individual movement of the axles of such wheels both vertically to compensate for inequalities of road surface and pivotally about certain desired centers for negotiating curves and also to provide means for resiliently urging the axles of the wheels to a neutral position and to prevent the axles from turning when braking or towing torque is applied to the wheels and axles.

It is another one of the primary objects of my invention to provide an improved structure for mounting the supporting wheels on heavy duty trucking equipment so that the wheels are permitted free, independent vertical action without interfering in any way with their individual load carrying capacity.

Another object of my invention is to provide a self-aligning tandem axle wheel truck which will permit the supporting tires to operate or "track" in parallel on straight stretches of road, but which will permit them to assume an arcuate position or relation when following roadway curves so as to lessen the "whetting" or wear of tires due to side motion.

It is a further purpose of my invention to provide a tandem truck gear in which the front axle of the tandem will align with the frame of the vehicle in turning, and the wheels of the rear axle will track in the arc made by the wheels of the front axle, and to provide a connection for the centers of the front and rear axles which will act, both as a torque control in braking, and as a drawbar for the rear axle.

Another object of the invention is to provide a resilient, load-bearing frame for the axles of such a truck supporting device, which will stabilize the body of the vehicle, while allowing the wheels mounted on the axles to find the path of least resistance on curves in either direction or on a straight road, and to provide a universal axle mounting for the resilient load bearing frame which will allow diagonally opposite wheels to mount obstructions at the same time without permanent distortion of the frame parts.

It is a further purpose to provide a frame for tandem axles which will permit resiliently controlled distortion of the frame to accommodate uneven footing for any of the four wheels on rough terrain.

It is a further purpose to provide a reverse spring mounting for tandem axles which will distribute the load on both sides of the axles at each point of connection to the springs, to neutralize internal stresses in the load bearing frame, and to provide for vertical spring application to the axles, regardless of the plane of the axles.

Another object of my invention is to provide universal, axle spring-mountings which will allow the axles to operate out of parallel on curves without disturbing the essential parallelogram of the load bearing frame, and to provide for the complete universal accommodation of the pair of axles while operating out of parallel in either the horizontal or vertical plane, or in both planes at the same time.

It is a further object of my invention to provide a pivotal stabilizing structure between the tandem load bearing frame and the vehicle body which will allow the maximum performance efficiency of the axle in saving tire wear, while stabilizing the vehicle body against lurching on rough roadway.

It is a still further object of my invention to provide for a universal acting grease retainer which will permit the free operation of the axles out of parallel in either plane, while guarding the mounting mechanism against intrusion of sand and grit.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

It should be noted that, although I have generally made reference to single wheels and tires, dual wheels may of course be used to increase the load carrying capacity.

In said drawings:

Figure 3 is a view in top elevation of an "underhung" trailer utilizing a tandem wheel truck constructed in accordance with one embodiment of my invention and as shown in Figure 1.

Figure 4 is a side elevational view of the device shown in Figure 3.

Figure 5 is a top elevational view of a highway trailer frame supported by a tandem axle wheel truck constructed in accordance with a modified form of my invention.

Figure 6 is a side elevational view of the device shown in Figure 5.

Figure 7 is a view in perspective, with portions of the structure broken away, illustrating a flexible or universal joint for connecting the frame to the tandem axles.

Figure 8 is a view, partly in side elevation, and partly in section, of the universal joint shown in Figure 7 with portions thereof broken away to better illustrate the structure.

Figure 9 is a view, partly in section and partly in end elvation, of the universal joint shown in Figures 7 and 8.

Figure 10 is a fragmentary view in perspective illustrating the construction and arrangement of the parts of the rear axle draw-bar and torque compensating member, with parts thereof broken away to better illustrate the structure.

Figure 11 is a fragmentary view, partly in elevation and partly broken away, illustrating the structure of the draw-bar shown in Figure 10.

Figure 12 is a fragmentary view in perspective of the rear end of a vehicle frame illustrating, particularly, the means employed in one embodiment of my invention for securing a wheel truck to the vehicle frame and illustrating some of the parts thereof in exploded relation.

Figure 13 is a fragmentary view in perspective of the roller drag-link structure attached to the forward tandem axle of a wheel truck constructed in accordance with a preferred embodiment of my invention and as used in place of the usual radius rod, and Figure 14 is a view in perspective of one form of locking device which may be used to prevent relative rotation of the axles in a horizontal plane and intended particularly for use backing up a vehicle.

Figure 1:
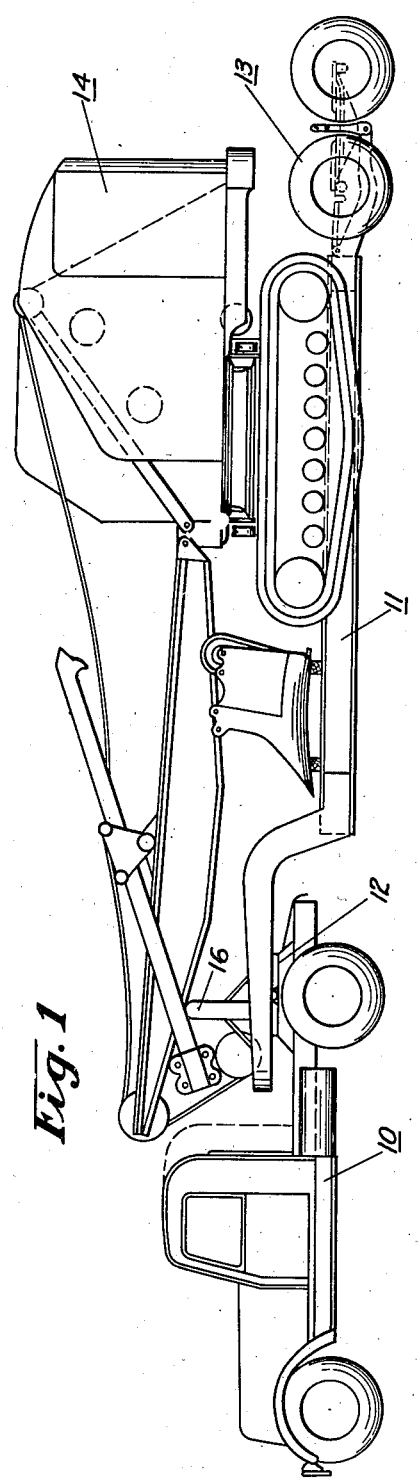
Figure 1 is a view in elevation illustrating how a wheel supporting means, constructed in accordance with one embodiment of my invention, may be employed in a trailer especially adapted for use in transporting heavy equipment.
Figure 2:
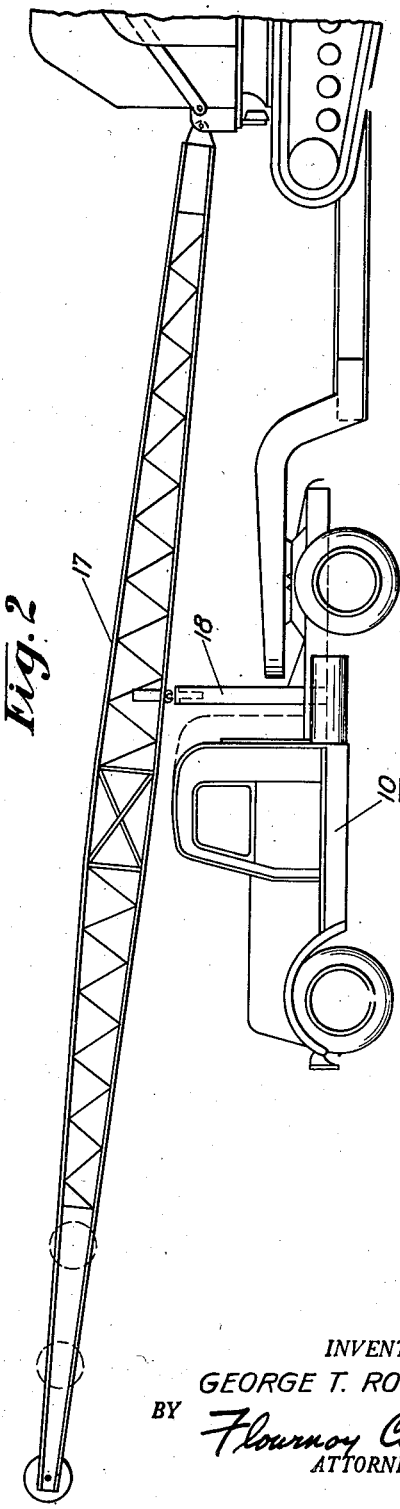
Figure 2 is a fragmentary view in elevation showing how the same device may be adapted to transport a power shovel having an unusually long boom.

Referring now to the drawings and more particularly to Figures 1 and 2 thereof; the devices there shown are considered representative of the type of equipment used for transporting heavy machinery or road equipment. A device of this nature may comprise, in general, a tractor 10, and a trailer 11 supported at its forward end on the rear end of the tractor by means of a fifth wheel structure 12. The rear end of the trailer may be supported on a tandem-axle wheel truck, such as indicated generally at 13, and this wheel truck is preferably removable, when used in connection with the underslung type of trailer frame shown. The method and means for removably mounting the trailer frame on the tandem-axle wheel truck is disclosed in detail and claimed in my co-pending application Serial Number 341,268 filed June 19, 1940.

The power shovel 14 may be driven under its own power into position on the trailer frame, as shown in Figure 1, when the rear tandem-wheel truck is removed, after which the rear wheel truck may be replaced. In attaching the frame to the tandem-axle truck, the frame is raised free of the ground and the entire weight of the frame is supported by the tandem-axle truck and the tractor truck through the fifth wheel structure previously mentioned.

The trailer frame may, of course, be of any desired length, but it is preferable that this frame be kept just as short as possible in order to comply with statutory regulations. In the case of the power shovel, shown in Figure 1, having a relatively short boom, the forward end of the boom may be supported, as shown, by a pedestal 16 extending upwardly from the forward end of the trailer frame.

In the case of a power shovel having an exceedingly long boom, such as the one shown at 17 in Figure 2, it is preferable that this boom be supported by a pedestal 18 extending upwardly from the main frame of the tractor vehicle 10 in order to prevent the boom from coming into contact with the tractor cab.

This invention, however, is concerned primarily with the tandem axle truck, as indicated generally at 13. I have shown this supporting truck in detail in Figures 3 and 4. The frame 11 may be built in accordance with the usual practice with the main portion of the frame 11a arranged to be supported by the wheel truck close above the surface of the ground. The forward end of the trailer frame is preferably cranked or made in the form of a "gooseneck" and provided with a king pin 11b for engagement with the fifth wheel structure of the tractor 10. The frame may also be provided near its forward end with a "landing gear" in the form of wheels or skids 19 for supporting the forward end of the vehicle when it is disengaged from the tractor.

A pair of frame extensions or lever arms 21, extending rearwardly from the rear end of the trailer frame 11, are adapted to be removably attached by means of a pair of hinged clevis-like members 22 to the frame of the tandem-axle wheel truck 13.

The wheel truck preferably comprises, in general, a pair of tandem axles 23 and 24 connected together by a pair of equalizer members 26 and 27. The load is pivotally applied to the equalizer members, as before described, by means of the lever arms or frame extensions 21 and the pivotally connected clevis members 22. The equalizer members may, of course, pivot freely about their pivotal connection with the clevis members, to thus permit the tandem axles to rise or fall independently of each other.

The axles may be solid or tubular members as shown, and each axle is provided with a pair of saddle-like members indicated generally at 28 and shown in detail in Figures 7 to 9 inclusive.

Such a saddle may include a mounting plate 29 bolted to a semi-cylindrical sleeve 31 adapted to be received over the axle. A companion sleeve 32 encircles the lower half of the axle and is held in place by means of a pair of U-shaped anchor bolts 33—33. A pair of spacing bars or plates 34—34 are mounted on the upper surface of the mounting plate, and these members are spaced apart, their adjacent edges being provided with curved recesses as shown at 36.

A circular bearing plate 37, of slightly less thickness than the spacer members 34, is positioned for rotatable movement in the circular recess provided by the spacer plates. This bearing plate 37 is held in position by means of strap-like members 38 bolted in place above the spacers by the U-shaped anchor bolts, with generous working clearance provided between the edges of 37 and 38 for side motion.

A cylindrical bearing sleeve 39 is welded, or otherwise secured, to the upper surface of the circular bearing plate 37, and the end of each equalizer bar 26 and 27 is of cylindrical shape, as shown at 41, so as to be both rotatably and slidably received in the bearing sleeve 39. Flanges 40 on the axles prevent excessive movement of the saddles longitudinally of the axles, but permit working accommodation of the saddles endwise as indicated in Figure 9.

The equalizer bars may be solid cast members but are preferably built up, as shown, and may include a solid bar 26a either cylindrical in cross section or square with turned ends to provide the bearing portions 41, and downwardly extending plate-like reinforcing members 26b. These equalizer bars are resiliently spaced apart for pivotal movement in parallel planes by a spacer tube 42. Flanges 43 are welded or otherwise mounted in fixed position on the spacer tube so as to space the equalizer bars which are secured on the ends of the spacer tube by means of washer-like portions of the clevis-like members 22, heavy springs 46, and nuts 47, mounted on the tie rod 47a. Springs 46 hold the equalizer bars firmly but resiliently against the flanges 43, but permit the rotation of the equalizer bars on tie rod 47a when one wheel passes over an obstruction. Springs 46 also allow a limited distortion of the equalizer bars out of parallel, when inward pressure is applied to one end of the equalizer by raising of a wheel from the horizontal plane. In this instance, the equalizer bar fulcrums on the adjacent side of the flange 43 and the other end of the equalizer bar has limited outward motion on its attached axle by reason of the working clearance of bearing plate 37 within members 38 and the working clearance of sleeves 31—32 within the flanges 40.

It will now be apparent that the axles are afforded great freedom of movement. Each saddle will permit sliding, swinging and turning movement of the axle relative to the attached equalizer bar and, quite obviously, any wheel may pass over an obstruction or drop into a hole without affecting the other wheels or distorting the wheel truck frame.

It is preferable that the forward drag of the vehicle be transmitted to the wheel truck by means other than the load supporting members I, therefore, preferably provide the radius rods 48 and pivotally attach these members to the frame or the frame extensions 21 and to brackets 49 attached to the forward side of the forward tandem axle. These radius rods thus transmit the pulling effort to the forward axle without interfering in any way with free vertical movement of that axle and its supporting wheels since the load is supported by the pivotal clevis members 22.

Brakes, indicated generally at 63, may be of any standard construction, and I have shown air controlled brakes with the air cylinders thereof shown at 64 operatively connected by rods 66 to a brake operating rod 67 having a cranked portion, as at 68. The brakes are preferably of the internal, expanding type (not shown) with the brake shoes operatively mounted on the axles. The brake cylinders 64 may also be mounted on plates 69 welded or otherwise attached to the axles. It is obvious that, when the brakes are applied in such a structure, the braking torque will be transmitted to the axles and will tend to rotate the axles about their longitudinal axes.

A draw-bar 51 hinged in the middle and connecting the forward axle and the rear axle, serves a dual purpose; it properly guides the rear axle relative to the forward axle and compensates for the braking torque applied to one axle by counterbalancing it with the braking torque applied to the other axle. This torque compensating member prevents rotation of the axles about their longitudinal axes. In its guiding function, the hinging of the draw-bar is important. Only by hinging in the middle will the rear tires follow in the tracks of the forward wheels, since the rear tracks will undercut or over-reach if the draw-bar is hinged any other place.

The draw-bar 51 is preferably constructed as shown in Figure 10 with a pair of tubular sleeves 52 and 53 welded to the axles at their mid-points, as shown in Figure 3. The adjacent ends of these tubular sleeves are joined together by a pivoted joint indicated generally at 54. This joint may comprise a pair of cylindrical members 56 and 57 received for limited rotation within the tubular sleeves. The members 56 and 57 are provided on their adjoining ends with bi-furcated portions 56a and 57a respectively, and these portions of the members 56 and 57 are joined together midway between the axles by pivotal members in the form of bolts 58 threaded into one of the members to permit pivotal movement about a vertical axis through the joint.

The cylindrical members 56 and 57 may be attached within the tubular sleeves 52 and 53 by means of bolts or pins 59 extending through these members. It is preferable that the bolt hole in one of these members be enlarged or made oval in shape as shown at 61 to permit limited rotation of the cylindrical members within the tubular sleeves and thus permit independent rotation of the axles in vertical planes.

Relative movement of the tandem axles in a horizontal plane is, of course, permitted by the pivotal connection of the joint 54. However, in order to remove the strain from the pivotal connection and to prevent uncontrolled movement of the joint, a sleeve 62 is pivotally mounted within the box-like enclosure formed by the joint 54. This sleeve is slidably received on the spacer tube 42 connecting the equalizer members.

It is believed that the operation of the device, when passing over uneven surfaces and rounding curves, is now apparent. The forward axle is drawn along by the radius rods in fixed alignment with the frame except when one wheel drops into a hole or low spot. In such case, the axle is permitted freedom of movement and the saddle mounted on the adjacent end of the axle may slide longitudinally of the equalizer bar to prevent distortion of the frame.

In rounding highway curves it is preferable that the forward wheels remain parallel to the frame. The rear wheels, however, are permitted, by virtue of the jointed draw-bar and the slidable saddles, to conform to the arc traversed by the forward wheels of the tandem axle truck. The rear wheels naturally follow the path of least resistance since they are guided to follow the front wheels, and side slipping and "whetting" of the rear tires due to faulty arc of turning is consequently avoided to a very large extent.

Referring again to Figures 7, 8 and 9; in order to prevent the entry of grit and the like into the slidable and rotatable joints of the saddle members, and to retain lubricant, I have provided a cylindrical grease retainer sleeve 71. This sleeve is in two parts, a lower portion 71a and an upper portion 71b. The lower portion 71a is fixed to the circular bearing plate 37 and the upper portion slidably received over the bearing sleeve 39 of the saddle. This upper portion of the grease retainer sleeve moves longitudinally of its axis with the equalizer bar but does not turn. The bearing portion of each equalizer bar is provided with an enlarged shoulder 41a to substantially seal that end of the grease retainer sleeve. The opposite end of this sleeve abuts a collar 72 fixedly mounted on the end of the bearing portion of the equalizer bar. Grease may be forced into the joint through a fitting 73. Thus it will be perceived, I have provided a novel and inexpensive closure for a difficult double acting joint, exposed to great hazard if unshielded and therefore a closure of great economic value.

It is preferable, when backing up a vehicle employing a tandem truck such as described, that means be provided for locking the rear tandem axle with the forward axle to prevent relative movement in a horizontal plane.

I have, accordingly, provided the locking bar shown at 73a in Figure 14. This bar is provided with a centrally positioned opening 74 adapted to be dropped over the universal joint 54, as shown in dotted lines in Figure 10. A bolt 76 passing through an opening 77 in the forward end of the locking bar is tapped into the drawbar 51 as at 76a and used to attach the locking bar to the draw-bar 51. The rear end of the locking bar is also provided with an opening 78 through which a bolt may be installed to prevent operation of the joint 54 when it is desired to back up the vehicle.

I have shown a modified form of my tandem axle structure in Figures 5 and 6, in which the load is carried by springs. This structure is particularly well adapted for use in connection with the ordinary highway trailer for use in transporting freight and the like.

In this embodiment of my invention, the vehicle frame 81 is mounted above the wheel truck and leaf springs are interposed between the frame and the wheel truck. The forward end of the frame is provided with a fifth wheel king pin 82 and a landing gear 83 in accordance with usual practice.

The entire tandem-axle wheel truck may be the same as that previously described in connection with Figures 3 and 4 with the exception that the collar 72 on the ends of the equalizer bars are made in the form of spring seats as shown in Figures 7, 8 and 9. A box-like member 72a, welded or otherwise fastened on the top of the collar 72, is adapted to receive the ends 84a of leaf springs 84. The spring seats are provided with replaceable hardened wear plates 85.

These springs may include the upwardly arched main springs 84 and the overload springs 84b all secured together by spring clamps and bolts indicated generally at 86. The upper of these spring securing members is provided with a bearing block 87. A truck bolster 88 may comprise a length of heavy channel iron with bearing plates or blocks 89 secured near the ends and pivotally engaged by means of a pin 91 to the bearing blocks 87.

The wheel truck may thus pivot about the pins 91 which, of course, bear all the load of the vehicle body.

The bolster 88 is provided with a heavy pivot pin 92 centrally of its upper surface, and this pin is received in a socket 93 attached to the center of the frame. Bearing plates 94 which are, of course, kept well greased are secured to the sides and below the frame by welding or the like and are braced by gussets 96. The bolster may be attached to the frame, to prevent dislodgement, by means of a heavy washer 97 and a cap screw 98 threadedly received in the pivot member 92.

I have found that this swivel mounting for the entire truck is advisable, although not essential, to the correct operation of the wheel truck when rounding curves. I have also found it advisable to provide means for resiliently forcing this bolster member 88 to assume and remain in a position at exactly right angles to the vehicle frame under normal conditions and when the vehicle is traveling forward in a straight line. The compression spring members 99 serve this purpose. These springs are attached by bolts or the like to angle brackets 101 extending downwardly from the vehicle frame, the opposite ends of the springs bearing against the bolster. Small blocks or guides 102 on the bolster retain the springs in proper position, and it will be apparent that these springs will, under normal conditions, bias the bolster toward its neutral position.

The forward axle of such a tandem wheel truck may be attached to the vehicle frame by radius rods, as previously described, but I have found that any substantial amount of vertical movement of the forward axle, in such case, results in mis-alignment of that axle. I have, therefore, provided the "drag" structure indicated generally at 103 for relieving the bolster pivot pin of the "drag" load.

This structure includes arcuately shaped guide-plate members 104 depending one from each side of the vehicle frame. These plate-like members are preferably mounted on the under side of the frame 81 by welding, and braces and gusset plates 106, as well as cross braces, better shown in Figure 12, prevent any movement of these members. The guide members 104 are provided with arcuate guide slots 106 having their centers at the pivotal mounting points between the springs 84 and the bolster 88.

Links 107, which may be welded to the forward axle near the ends thereof, extend forwardly and terminate in yokes 108 (shown in detail in Figure 13). A roller 109, rotatably received between the arms of each yoke, is disposed in the guide slot 106. It is obvious now that the forward axle may move vertically as required due to a heavy or light load or due to the resilience of the springs without moving the forward axle forwardly out of its natural orbit of movement as determined by its pivotal mounting.

It is preferable that the arms 108a and 180b of the yokes be spaced apart a greater distance than the thickness of the guide plates 104 in order to permit limited rotation without binding of the forward axle in a vertical plane.

Relatively narrow, horizontally-extending bosses or spacers 111 are provided on the inside of the yoke arms so as to prevent lateral movement when the axle is in its normal position.

I have provided a tandem-axle wheel truck for use with highway trailers and transport vehicles which will overcome the deficiencies and shortcomings of wheel trucks constructed in accordance with the prior art.

A device, such as I have shown, is extremely flexible and readily adapts itself to the road surface whether it be smooth or uneven. The wheel truck adapts itself to these and any unusual conditions without any distortion of the parts of the wheel ruck and without disturbing the essentially parallel and vertical relation of the load bearing springs if such are employed. A device, constructed in accordance with my invention, is free to adapt itself to curved roadways.

The wheels are self-aligning to permit them to take the correct arc of turning and thus eliminate most of the major causes of tire wear as experienced with devices used heretofore. I have also provided means for compensating for the braking torque on the axle in such a manner as to eliminate the strains ordinarily present in the axle supporting members.

Although I have described several specific emmodiments of my invention, it is apparent that modifications thereof may be made by those skilled in the art. Such modifications may be made without departing from the spirit and scope of my invention as set forth in the appended claims.

I claim as my invention:

1. In a vehicle, a pair of tandem axles, a pair of equalizer members disposed transversely of the axles, a tie rod disposed centrally of the equalizer members with the said equalizer members mounted for substantially free swinging movement adjacent the ends of the tie rod, means on the tie rod for spacing the equalizer members apart, spring means disposed on the sides of the equalizer bars opposite the spacing means for biasing the equalizer bars toward said spacing means bearings connecting said equalizer members to said axles to allow limited rotation of said axles in both horizontal and vertical planes, supporting springs attached to the frame, and spring engaging members mounted near the ends of said equalizer members for transferring the load from the springs to the axles.

2. In a wheel truck, a pair of axles, a pair of centrally spaced rotatable members mounted and resiliently secured together in spaced relation on and transversely of the axles, universal-action bearings connecting said members and said axles to allow limited rotation of either of the axles in horizontal or vertical planes, springs arched upwardly at their center portions and adapted for supporting a load on said arched center portions, and spring seats for mounting the outer ends of the springs, said spring seats mounted near the outer ends of the rotatable members undisturbed by the said rotation of the said axles in either plane.

3. In a wheel truck, a pair of tandem axles, wheels for supporting the axles, equalizer bars, means for attaching the axles to the ends of the equalizer bars for substantially universal movement relative thereto, means for pivotally and resiliently connecting the equalizer bars near the juncture of their transverse axis with the horizontal axis of said axles to prevent any substantial movement in any but relatively vertical, parallel planes at right angles to their transverse axis, said means comprising a shaft, loosely received adjacent its ends in openings in the equalizer bars, means on the shaft for spacing the equalizer bars, and resilient means for biasing the equalizer bars toward the spacing means, and means for applying a load in a direction substantially vertical to the equalizer bars and above the centers thereof.

4. In a wheel truck, a pair of tandem axles, wheels, a resilient frame, bearings connecting the axles and the frame for substantially universal relative movement, a centrally positioned torque member holding the axles together at their respective centers, and a flexible joint disposed centrally of the torque member connecting the portions of the torque member for relative movement about the axis thereof and about a vertical axis passing therethrough to allow the axles to operate out of parallel in either the horizontal or vertical planes to guide the rear wheels in the tracks of the front wheels, but to prevent the rotation of either of said axles on its own longitudinal axis under braking torque.

5. In a wheel truck, a pair of tandem axles, a pair of equalizer members disposed transversely of the axles, means movable in a plurality of directions for connecting the equalizer members to the axles, a torque member connecting said axles at their respective centers for balancing the braking torque of one axle against the braking torque of the other axle, a centrally disposed flexible joint in the torque member to permit the axles to operate out of parallel, rod-like means for pivotally connecting the equalizer members near the longitudinal centers thereof, and means pivotally connected to the torque beam and slidably connected with the rod-like means to support and guide the flexible joint of the torque member when the axles operate out of parallel in traversing curves.

6. A lubricating joint for connecting an axle and a frame member including a sleeve, a swivel, for supporting the sleeve, mounted substantially transverse to the axle, means for slidably engaging the frame member in the sleeve member, means for rotatably engaging the swivel to the axle, and a two part tubular grease retainer mounted over the sleeve one part thereof being slidable with the frame member.

7. In a vehicle, a frame, a tandem wheel truck, resilient pivoted means for attaching the frame to the wheel truck for transferring the vehicle load to the truck, and means including arcuate guides mounted on the vehicle frame and guide links attached to the truck engageable with the arcuate guides for transferring the "drag" load to the frame at a constant radius from the pivot of said resilient pivot means.

8. In a tandem-axle wheel truck, the combination of a pair of axles, wheels for supporting the axles, centrally disposed draft means hinged for permitting relative movement of the axles in a horizontal plane, and means co-operative with said draft means for locking the axles to prevent such relative movement.

9. In a vehicle, a pair of tandem axles, wheels mounted on the axles, a vehicle frame disposed above the axles, an intermediate frame for supporting the vehicle frame clear of the axles, universal means disposed between said axles and intermediate frame for permitting synchronized movement of the axles relative to the intermediate frame to allow operation of the axles out of parallel in both horizontal and vertical planes, and draw-bar means secured to the axles at the mid-points thereof, said draw-bar means being pivotally connected together for relative movement about a vertical axis coincident with the juncture of the horizontal and transverse axes of the intermediate frame to guide the wheels of the rear axle to follow the tracks of the forward axle through any variation of arcs while the vehicle is turning.

10. In combination, a vehicle body, wheeled tandem axles, with the front axle thereof held in working alignment with the said vehicle body, with a centrally mounted drawbar extending to the rear from said front axle, with a centrally mounted drawbar extending forward from the rear axle an equal distance, and a pivot joint having its axis at substantially right angles to the common plane of the axles connecting the said drawbars, in order that any deviation from a common horizontal axis by the drawbar of the front axle will be synchronized with an equal deviation by the rear axle, to insure the traveling of the rear wheels in the wheel prints of the front wheels while the vehicle is turning.

11. In combination, a pair of wheeled tandem axles spaced apart at their centers by a centrally and vertically hinged drawbar, a vehicle frame disposed above the axles, an intermediate frame including equalized bars, resiliently connected together in substantially parallel, vertical planes, for connecting said vehicle frame to said axles, the resilient connecting means permitting limited synchronized movement of the axles relative to each other and relative to the vehicle frame without substantial distortion of the parallel relation of the equalizer bars of the intermediate frame.

12. In combination, a pair of wheeled tandem axles spaced apart at their centers by a drawbar hinged centrally thereof for pivotal movement about a vertical axis, a vehicle frame, intermediate frame members attached thereto universal means for mounting the intermediate frame members on the axles to permit diagonally opposite wheels to mount obstructions at the same time without permanent distortion of the frame and without deflection of said intermediate frame members from substantially vertical planes, and means for resiliently biasing said intermediate frame members back into substantial parallelism if deflected therefrom.

13. In a wheel truck, a pair of tandem axles, a pair of equalizer members disposed transversely above and mounted on the axles, and adapted for limited rotation in substantially vertical planes passing through their longitudinal axes, means for resiliently spacing the equalizer members transversely of their longitudinal centers comprising a shaft loosely received in openings in the equalizer members, annular members mounted on the shaft in spaced relation for spacing the equalizer members apart, resilient means disposed on the shaft on the sides of the equalizer members opposite the annular spacing members for biasing said equalizer members toward the said spacing members and means mounted on the shaft for adjusting the pressure of the resilient means against the equalizer members, and universal means for attaching the said equalizer members to the axles for limited movement relative thereto to permit controlled partial rotation of the axles in both horizontal and vertical planes.

14. In a vehicle, a main frame, a tandem axle truck including a pair of axles, a pair of equalizer members, and means for mounting the axles on the equalizer members for limited universal movement relative thereto and for limited sliding movement adjacent the ends and longitudinally of the equalizer members, a load bearing plate on the frame, a bolster-plate, means for pivotally securing said plate to the under side of the load bearing plate, means for transferring a vertical load from the bolster-plate to the equalizer members, spring means operatively disposed between the bolster-plate and the main frame, normally biasing the bolster-plate to a position at right angles to the longitudinal axis of the main frame, whereby the bolster-plate and the entire wheel truck may turn a limited distance when the vehicle is traversing a curved roadway, and drawbar means operatively disposed between the axles at the midpoints thereof, the said drawbar being vertically hinged substantially on the extended axis of the bolster-plate pivot means whereby each axle may not only assume a position substantially radial to the arch of the curve being traversed by the vehicle, but will simultaneously cause the other axle to assume a position also radial to the arc of the curve being traversed.

15. In a tandem axle wheel truck, a pair of axles, wheels for the axles, a pair of load-equalizer frame members, means for connecting the ends thereof and the axles for limited pivotal and slidable movement relative thereto, a drawbar and torque tube connecting the said axles and comprising a tubular member secured to each axle at the midpoint thereof, a stub shaft member disposed within the open end of each tubular member, pins extending through openings in both tube and stub shaft, the openings in at least one of said members being enlarged transversely of the shaft and tube, whereby the stub shaft may rotate to a limited degree within its tube, a transverse shaft connecting the equalizer frame members at their midpoints, means for hingedly securing the free ends of the stub shafts together for pivotal movement about an axis at right angles to the axes of both the cross shaft and the drawbar, and means slidably supporting the hinged portion of the stub shaft on the cross shaft.

16. In a wheel truck including an axle and a frame member, means for mounting said members for limited relative movement comprising a saddle block, means for clamping said saddle block to the axle, a swivel plate received and rotatable within the saddle block, a sleeve slidably and rotatably receiving the end of the frame member, said sleeve being affixed to the swivel plate, said frame member having a cylindrical portion of a diameter substantially as large as the outer diameter of the sleeve, and a tubular grease retainer mounted over the sleeve and the enlarged portion of the frame member and slidable with one of said members.

GEORGE T. RONK.